Nov. 14, 1961 G. W. COOK ET AL 3,009,064
TELEMETERING SYSTEM
Filed Nov. 22, 1957 5 Sheets-Sheet 1

INVENTORS,
GEORGE W. COOK
THOMAS B. MC GUIRE

BY

ATTORNEY

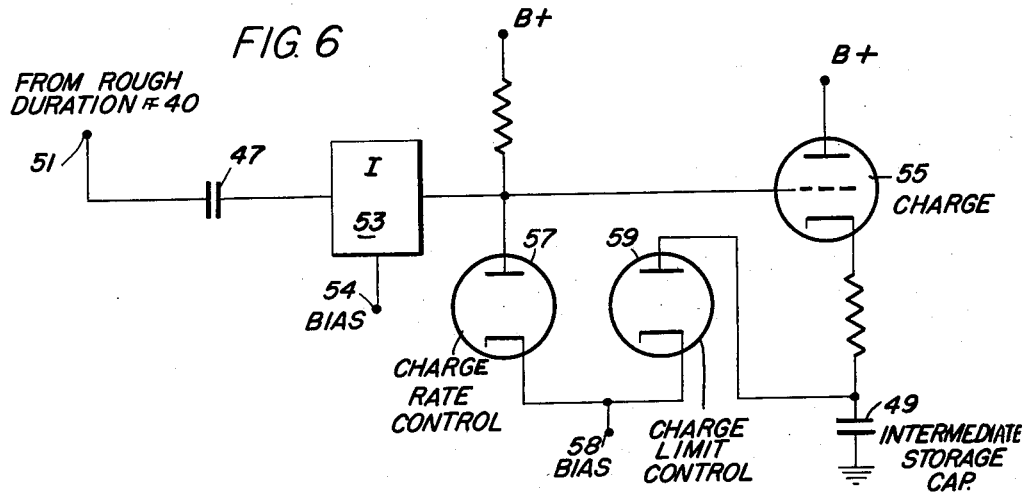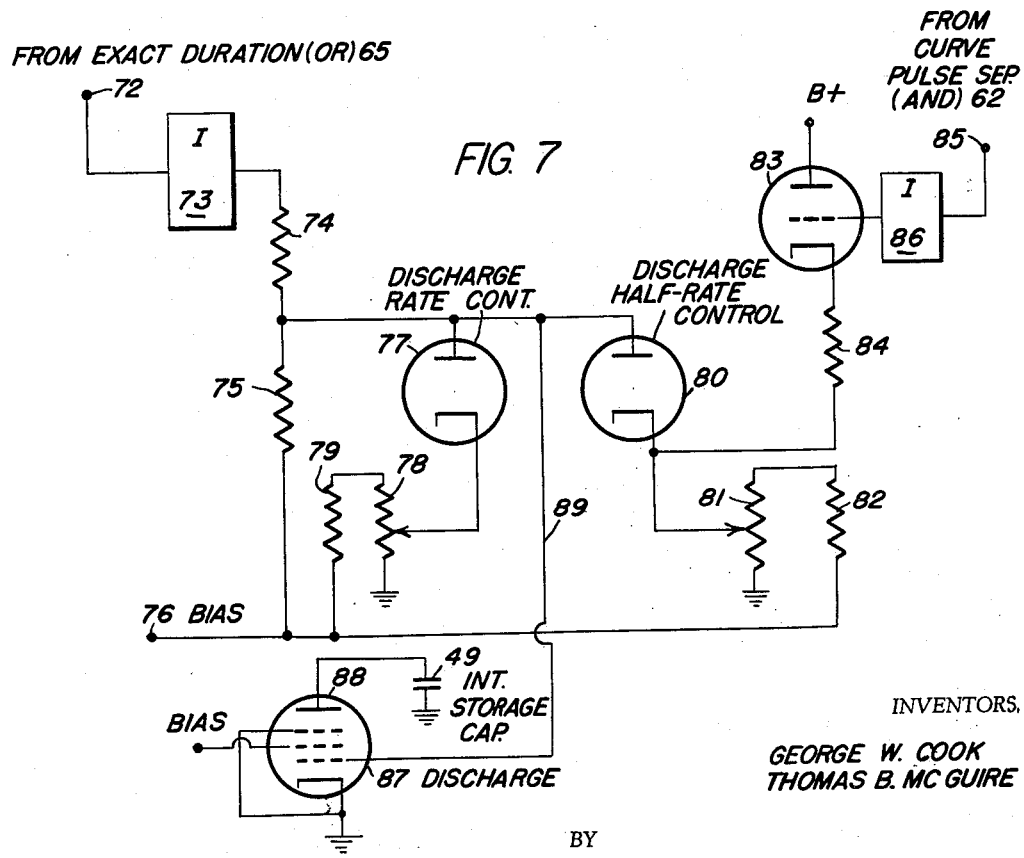

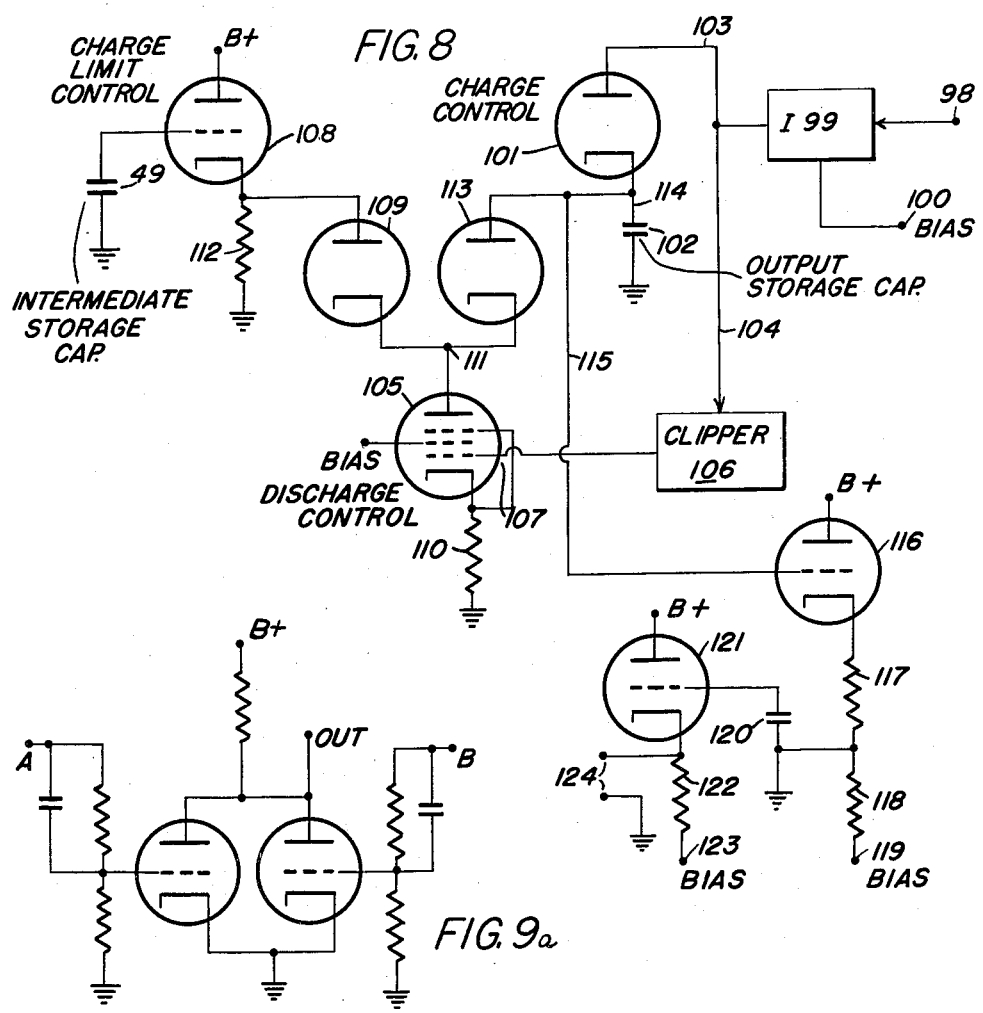
FIG. 8
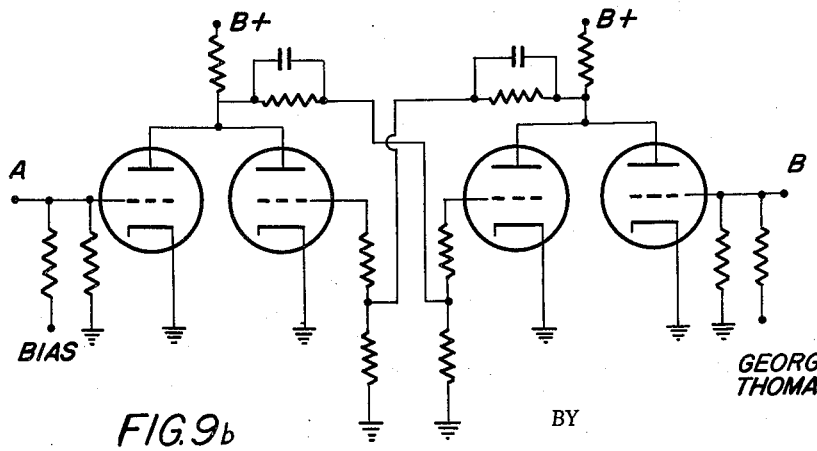
FIG. 9a
FIG. 9b
INVENTORS,
GEORGE W. COOK
THOMAS B. MCGUIRE
BY
ATTORNEY United States Patent Office 3,009,064
Patented Nov. 14, 1961

3,009,064
TELEMETERING SYSTEM
George W. Cook, Washington, D.C., and Thomas B. McGuire, Santa Ana, Calif., assignors to Reed Research Inc., Washington, D.C., a corporation of Delaware
Filed Nov. 22, 1957, Ser. No. 698,162
11 Claims. (Cl. 250—219)

This invention relates to improvements in telemetering systems, and more particularly to systems designed to transform a plotted curve on a graph into a continuously varying output voltage.

When it is desired to transform a plotted curve on a graph or chart to a voltage which may be used to reconstruct the conditions recorded on the chart, the prior art requires a human operator to trace the outline of the plotted curve with a stylus, the movement of which operates a transducer to present an output voltage relative to the movement of the stylus. This procedure is unsatisfactory because it allows the human errors of the operator to affect the result. Through inattention or fatigue, the characteristics of the output frequently bear only a slight relation to the quantity actually recorded and desired to be reconstructed.

The invention overcomes these difficulties by providing a fully automatic chart reader which does not require the attention of a human operator. Accordingly, it is an object of the invention to provide such a transducer which is fully automatic and not subject to random error inherent in a system which relies on a human operator.

Another object of the invention is to provide means for ensuring error free operation of the transducer by continuing the preceding output if an error is subsequently discovered.

A further object of the invention is to provide capacitor storage means for registering continuously a varying voltage proportional to the ordinate of the graph, the output voltage of the chart reader appearing across said capacitor.

Another object of the invention is to provide means for scanning the chart in a direction perpendicular to the time axis of the chart, whereby the ordinate of the graph at any point on the time axis may be determined by reference to the instant in each scanning cycle when the scanning beam crossed the curve of the graph.

A further object of the invention is to provide storage means in the form of a capacitor, the voltage across which at any instant represents the progress of the scanning beam across the graph, and which voltage is stabilized at that amplitude which represents the ordinate of the curve being scanned, at a particular abscissa.

Another object of the invention is to provide means for sampling the voltage across one capacitor (representing the progress of the scanning beam across the graph before the curve of the graph is scanned), just before the end of a scanning cycle, and storing in a second capacitor, a voltage proportional to that sampled across the first capacitor.

These, and other objects of the invention, will become more clear to all those skilled in the art by reference to the description which follows, in which:

FIG. 6 is a schematic diagram of the circuit used for controlling the charge on the storage capacitor.

FIG. 7 is a schematic diagram of the circuit used for controlling the discharge on the storage capacitor.

FIG. 8 is a schematic diagram of the sampling and output circuits.

FIG. 9 is a schematic diagram of the AND gate, OR gate and flip-flop.

FIG. 9a is a schematic diagram of the AND gate and the OR gate.

FIG. 9b is a schematic diagram of the flip-flop.

*General description*

Figure 1:
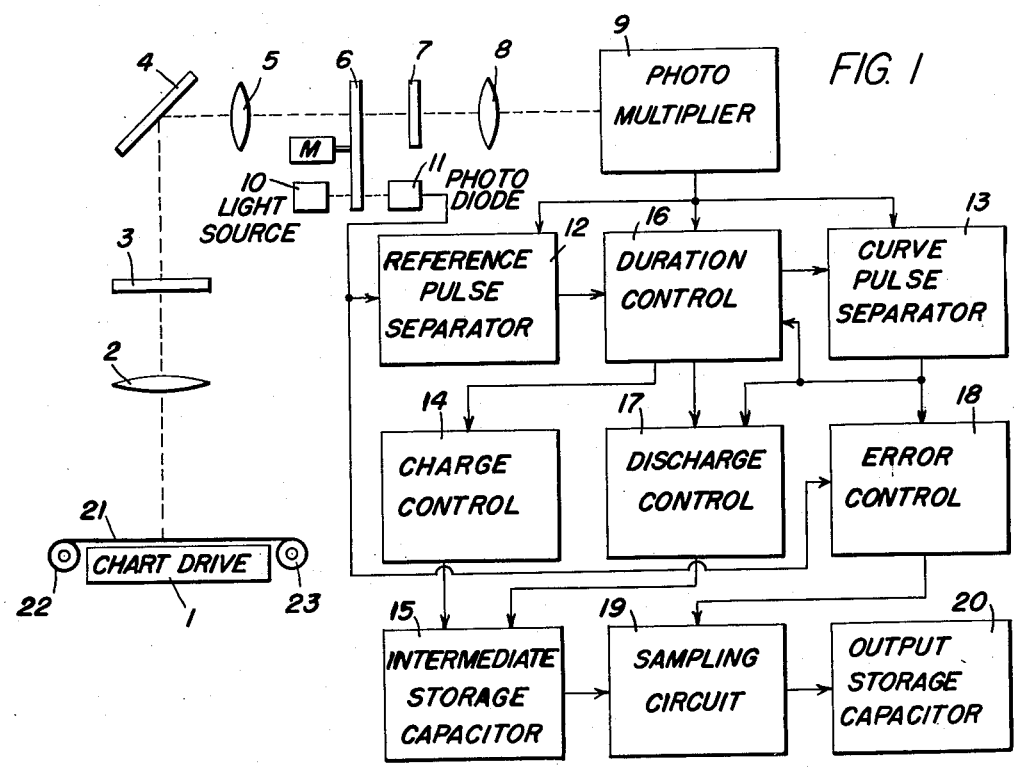
FIG. 1 is a functional block diagram of a chart reader system constructed in accordance with the subject invention.
Figure 2:
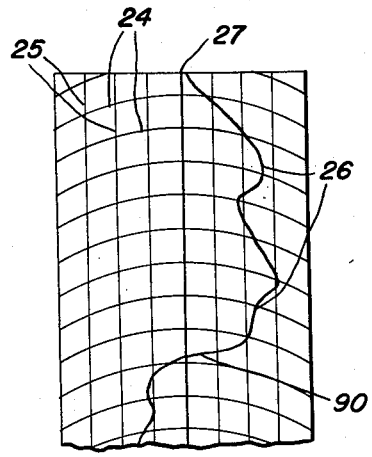
FIG. 2 is a diagram of a chart which may be read by the chart reader of FIG. 1.

Referring first to FIG. 1 there is shown a general functional view of the chart reader. A chart drive 1 transports a chart 21 from a roller 22 to a roller 23 at constant velocity. The chart may be similar to that shown in FIG. 2 having a time axis 27, lines of equal ordinates 25, lines of equal abscissas 24, and a plotted curve 26. The chart is prepared in a standard chart recorder which transcribes data onto the chart by means of a pen. The equal abscissa lines 24 are arcs of circles and have radii equal to the radius of the arm of the pen associated with the recorder (not shown).

Figures 3, 4:
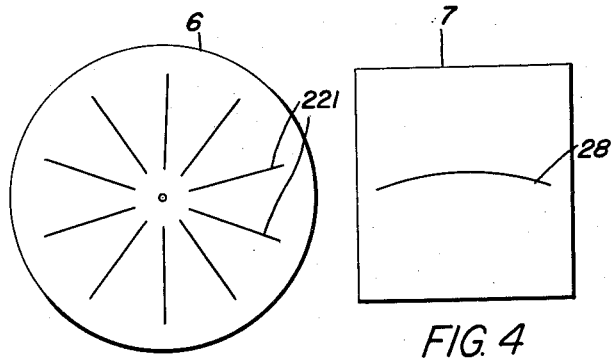
FIG. 3 is a diagram of the scanning disc employed by the chart reader.
FIG. 4 is a diagram of the scanning mask used by the chart reader.

As the chart is moved by the chart drive 1, it is scanned by an optical system having lens 2, filter 3, mirror 4, lens 5, scanning disc 6, scanning mask 7, lens 8, and a photo multiplier 9. Lenses 2 and 5 are convex lenses and operate to focus an image of the chart on scanning disc 6. The filter 3 is of the same color as the lines 24, 25 and 27 on the chart (see FIG. 2), and effectively filters out these lines so that they do not appear in the image focused on scanning disc 6. The scanning disc 6 is rotated at 100 cycles per second and has ten equally spaced radial slots 221, as shown in FIG. 3, and thus scans the chart 1000 times per second. The image of the chart, as scanned by the scanning disc 6, falls on scanning mask 7. This mask, shown in FIG. 4, has a slot 28, which is an arc of a circle having the radius equal to that of the pen which produced the chart in the recorder (not shown) and the equal abscissa lines on the chart (blocked by filter 3). The scanned image which passes through the scanning mask 7 then passes through converging lens 8 and is focused on photo multiplier 9. The length of arc of slot 28 in scanning mask 7 is such that a period of "no light" is obtained between each successive scanning. As each slot 221 in scanning disc 6 passes beyond the end of the slot 28 in scanning mask 7, the next slot 221 in the scanning disc has not yet arrived at the beginning of the slot 28 in scanning mask 7.

Figure 10:
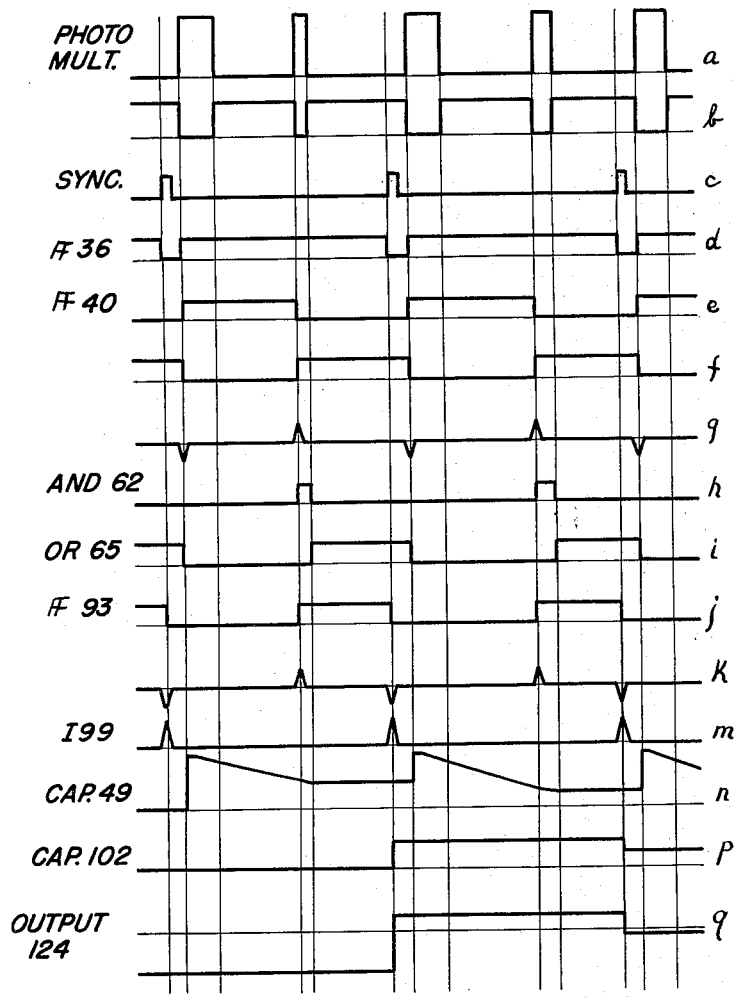
FIG. 10 is a timing diagram showing the relative time of various signals throughout the chart reader.

The output of the scanning mask 7, as received by the photo multiplier 9, is a dark space between each scanning cycle, followed by a light space as the chart is scanned, interrupted only by a dark pulse as the plotted curve is crossed. The dark space between each scanning cycle is used as a reference pulse, and the dark pulse caused by the scanning of the plotted curve determines the ordinate of the point of the curve being scanned during that scanning cycle, by its time position in relation to the reference pulse. The photo multiplier tube produces a pulse for each dark space resulting from each scanning cycle. The output from the photo multiplier tube is shown in FIG. 10a.

A light source 10 is also scanned by scanning disc 6, permitting the photo diode 11 to produce a pulse each time a slot 221 (see FIG. 3) in scanning disc 6 passes between the light source 10 and the photo diode 11. The photo diode and its corresponding light source are positioned to produce a pulse each cycle just before the reference pulse. The output of the photo diode is shown in FIG. 10c. These pulses, hereafter called sync pulses are used to discriminate between the two types of pulses produced by the photo multiplier 9, and also to determine the time for sampling the intermediate storage capacitor, as will be more fully described later.

The output of the photo multiplier 9 and the sync pulse output of photo diode 11 are fed into a reference pulse separator 12 which separates the reference pulse from the curve pulse in the photo multiplier output. The reference pulse output from reference pulse separator 12 and the output of the photo multiplier 9 are used to actuate the duration control 16, one of the outputs of which controls the operation of the charge control 14 to charge the intermediate storage capacitor 15 at the beginning of each reference pulse. At this time during each scanning cycle, the intermediate storage capacitor is charged to the same specific level as shown in FIG. 10n.

Another output of the duration control 16 is combined with the output of the photo multiplier 9 in the curve pulse separator 13 to separate the curve pulse from the output of photo multiplier 9. The curve pulse output of the curve pulse separator 13 is fed to a third input of the duration control to supervise the exact duration of the output of the duration control 16 fed to the discharge control 17. The discharge control 17 slowly discharges linearly the intermediate storage capacitor 15 from the leading edge of the reference pulse to the trailing edge of the curve pulse, as shown in FIG. 10n. The rate of discharge is changed during the period of the curve pulse, and is controlled by the input to the discharge control 17 from the curve pulse separator 13. When the duration of the discharge expires, the voltage across the capacitor will be held constant until the next charge cycle. Thus a voltage such as that shown in FIG. 10n is produced across the capacitor.

The sync pulse output of the photo diode 11 is combined with the curve pulse output of the curve pulse separator 13 in the error control means 18. The error control means 18 will emit a signal to the sampling circuit 19 if, and only if a curve pulse was received from the curve pulse separator 13 during the preceding scanning cycle. If a curve pulse was received, the error control means 18 will actuate the sampling circuit 19 to cause the output storage capacitor 20 to be charged to a level proportional to that of the intermediate storage capacitor 15. The sampling occurs at a time when the intermediate storage capacitor 15 is at its steady state, viz, after the occurrence of a curve pulse (see FIG. 10n). Hence the voltage appearing across the terminals of the output storage capacitor 20 is continuous, and represents the ordinate of the plotted curve at any instant.

*Detailed description*

Figure 5:
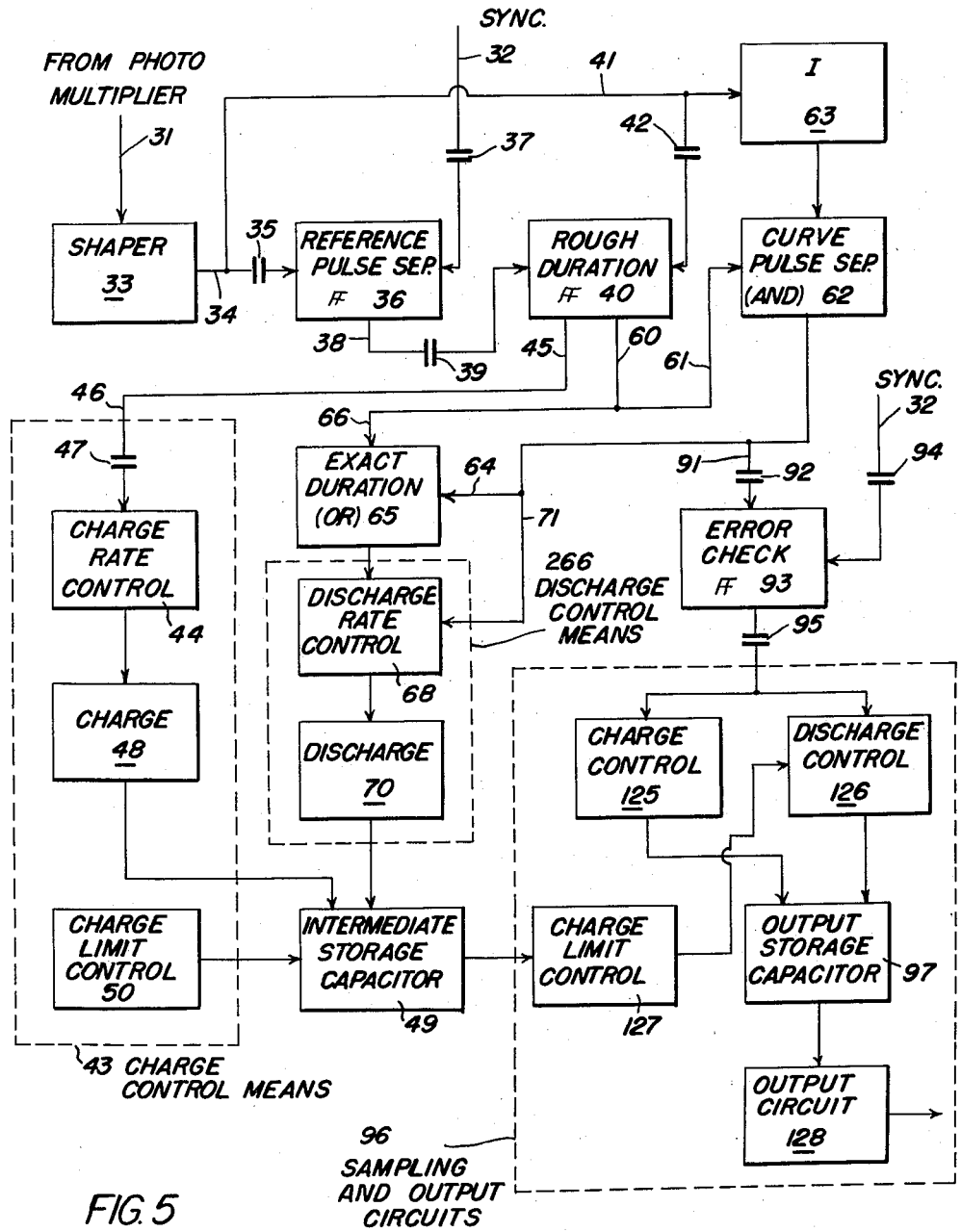
FIG. 5 is a functional block diagram of the means used in connection with chart reader for extracting useful information from the output signals of the photoelectric transducers.

Referring now to FIG. 5, there is shown a more detailed block diagram of the electronic structure of the chart reader, having as inputs 31 and 32, representing the outputs of the photo multiplier and photo diode, respectively. The output of the photo multiplier is shaped and squared in pulse shaper 33 and fed over line 34 through differentiating capacitor 35, and into the set input of flip-flop 36. The sync pulse output 32 is differentiated by capacitor 37 and fed into the reset input of flip-flop 36. The output of flip-flop 36 is therefore triggered On at the leading edge of the reference pulse and Off at the sync-pulse. This output, shown in FIG. 10d, always occurs at the leading edge of the reference pulse shown in the waveform of FIG. 10a, and serves to distinguish the reference pulse from the curve pulse (also shown in FIG. 10a).

The output of flip-flop 36 is fed over line 38 to the set input of flip-flop 40 through differentiating capacitor 39. The other input of flip-flop 40 comes from shaper 33 via line 41 and differentiating capacitor 42. Flip-flop 40 is triggered On by the leading edge of the output of flip-flop 36 (shown in FIG. 10d), and Off by the leading edge of the curve pulse (shown in FIG. 10a). The two outputs of flip-flop 40 are shown in FIGS. 10e and 10f, and control the operation of the intermediate storage capacitor.

The charge control means enclosed within the dashed rectangle 43, includes a charge rate control means 44, actuated by the output 45 of the flip-flop 40 over line 46 and through differentiating capacitor 47; and a charge means 48 actuated by the charge rate control means. The intermediate storage capacitor 49 is responsive to the charge means 48. Also included within the charge control means 43 is the charge limit control 50. This unit ensures that the intermediate storage capacitor 49 is charged to exactly the same voltage each cycle.

Referring now to FIG. 6, the entire charge control means is shown in detail. The output 45 (shown in FIG. 10f) from flip-flop 40 (shown in FIG. 5) is fed through the input 51, to the differentiating capacitor 47, the output of which consists of two sharp spikes as shown in FIG. 10g, a negative one at the beginning of the reference pulse, and a positive one at the beginning of the curve pulse. This waveform is fed into an inverter 53, which is biased to be conducting by bias voltage 54. When the positive going pulse of the waveform shown in FIG. 10g is received by the inverter 53, its output is unchanged, but when the negative going pulse of the waveform appears, inverter 53 emits a positive going pulse to the grid of the charge triode 55. The charge triode 55 then conducts, charging the intermediate storage capacitor 49, in its cathode circuit. The charge rate control diode 57 is connected between the output of the inverter 53 and bias voltage 58, limiting the output of the inverter to the bias potential, so as to protect the grid of the charge triode 55. The charge limit control diode 59 is connected between the intermediate storage capacitor 49 and bias voltage 58 so as to limit the voltage to which intermediate storage capacitor 49 may be charged to the value of bias voltage 58. This ensures an equal charge on capacitor 49 each cycle.

In the operation of the charging control, inverter 53 is normally conducting, and the grid of the charge triode 55 is normally at ground potential, the normal output of inverter 53. When a pulse is received over input 51, it is differentiated and the resulting negative pulse (at the beginning of each reference pulse) is used to cut off the inverter 53, which then drives the grid of the charge triode 55 positive to a voltage determined by bias voltage 58. The charge triode then conducts, charging the intermediate storage capacitor 49 to a voltage determined by the bias voltage 58. This charging of the intermediate storage capacitor occurs at the beginning of each reference pulse. FIG. 10n shows the voltage across intermediate storage capacitor 49, and indicates that the voltage is driven to the same potential at this time each cycle.

Referring again to FIG. 5, the waveform illustrated in FIG. 10e emerges on the output 60 of the flip-flop 40, and is fed to one input of the AND gate 62 over line 61. The other input of AND gate 62 comes from the shaper 33 over line 41 through inverter 63. The inverted signal from the wave shaper is shown in FIG. 10b. The AND gate 62 produces a positive output in response to two simultaneous negative inputs. The only time period during each cycle when both inputs are negative is for the duration of the curve pulse. Thus the output of the AND gate 62 is a positive pulse once each cycle, of duration equal to the width of the line as scanned, and is shown in FIG. 10h.

This input is fed via line 64 to OR gate 65. The other input of the OR gate 65 comes from output 60 of flip-flop 40 over line 66, which is a positive pulse lasting from the leading edge of the reference pulse to the leading edge of the curve pulse, as shown in FIG. 10e. OR gate 65 produces a negative output in response to any positive inputs and hence its output (shown in FIG. 10i) is a negative pulse from the leading edge of the reference pulse to the trailing edge of the curved pulse. The output of OR gate 65 is therefore longer than the output of flip-flop 40 by the duration of the curve pulse.

The output of OR gate 65 is fed to the discharge rate control 68, which receives a curve pulse as another input over line 71 from the curve AND gate 62. The discharge rate control 68 controls the discharge means 70 to linearly discharge the intermediate storage capacitor 49 during the scanning cycle at one rate until the leading edge of the curve pulse is encountered, and then at one half that rate for the duration of the curve pulse. The discharge control means enclosed in rectangle 266 is shown in detail in FIG. 7.

Referring now to FIG. 7, the discharge control circuit is shown in detail. The intermediate storage capacitor 49 is the same capacitor as that shown in FIG. 6. It is discharged linearly through the pentode 88, when the latter is conducting, according to the voltage on its grid 87. This voltage is derived via line 89 from the drop across the voltage divider comprising resistors 75 and 74.

The output (shown in FIG. 10i) of the OR gate 65 (shown in FIG. 5) is fed to the input 72 of the inverter 73. The output of inverter 73 is at a high potential from the leading edge of the reference pulse to the trailing edge of the chart pulse, and at ground potential for the rest of each cycle. This output is fed through the voltage divider comprising resistors 74 and 75 to a negative bias potential 76. In parallel with resistor 75, there is a discharge rate control diode 77 in series with a potentiometer 78 to ground. Varying the resistance of potentiometer 78 controls the bias on the cathod of diode 77, which is supplied by the voltage divider from bias potential 76 through resistor 79 and potentiometer 78 to ground. The amount of bias on the cathode of diode 77 determines how much current will pass through it when its plate is positive, and thence controls the voltage drop across resistor 74. The position of the potentiometer 78 thus determines the rate of discharge of the intermediate storage capacitor 49, from the beginning of the reference pulse to the end of the curve pulse, by affecting the voltage on grid 87 of pentode 88.

Also in parallel with resistor 75 is discharge half-rate control diode 80, in series with potentiometer 81 to ground. Varying the resistance of potentiometer 81 varies the bias on the cathode of diode 80, which is supplied by the voltage divider from bias potential 76, through resistor 82 and potentiometer 81 to ground. Discharge half-rate control diode 80 operates in the same way as discharge rate control diode 77, except that it is operative only during the duration of the curve pulse. The output of inverter 86 is normally positive, allowing conduction in discharge half-rate control triode 83 which thus conducts current through its cathode resistor 84 and through potentiometer 81 in series with it. This produces a voltage drop across potentiometer 81 which inhibitively biases the cathode of discharge half-rate control diode 80, cutting off conduction through that tube.

When a positive curve pulse appears on input 85 from the curve pulse separator 62 in FIG. 5, it is inverted in inverter 86, and fed to the discharge half-rate control triode 83, which is cut off for the duration of the curve pulse. This eliminates the inhibiting bias on the cathode of discharge half-rate control diode 80, and permits it to conduct according to the remaining bias on its cathode, as controlled by the setting of potentiometer 81. The current flow through the diode 80 increases the voltage drop across resistor 74, and lowers the voltage presented to the grid 87 of discharge pentode 88 over line 89, for the duration of the curve pulse. This permits discharge of the intermediate storage capacitor 49 at a lower rate.

In the operation of the discharge control, the output of inverter 73 permits discharge of the intermediate storage capacitor 49 only from the beginning of the reference pulse (when the intermediate storage capacitor 49 is charged) to the end of the curve pulse. During all this period, the conduction through resistors 74 and 75 and diode 77, produces a specific voltage on the grid 87 of the discharge pentode 88, which discharges the capacitor at a constant rate. For the period of the curve pulse, the conduction of diode 80 causes more current to flow through resistor 74, lowering the voltage on the grid of the discharge pentode 88, and causing the intermediate storage capacitor to discharge at a lesser rate of discharge. In practice, potentiometer 81 is adjusted so that the rate of discharge for the duration of the curve pulse is one-half that of of the "regular" discharge rate.

This mode of operation permits the capacitor to be discharged to a level as if the "regular" discharge rate were continued to a point in time when the middle of the plotted curve is reached. Thus the voltage on the intermediate storage capacitor after discharge is terminated each scanning cycle represents the ordinate of the midpoint of the curve line on the chart being scanned. This feature is highly desirable in two cases: (1) when the curve line on the graph is extremely thick, as would be caused by a recorder using a pen with a broad point, and (2) when the slope of the curve being scanned is nearly parallel with the scanning path, as, for example, at point 90 on the curve illustrated in FIG. 2.

The voltage across the intermediate storage capacitor 49 when the discharge is terminated at the end of the curve pulse is permitted to remain stored in the capacitor until the beginning of the next reference pulse, when the capacitor is again charged to its starting value by the charging circuit, described above. Thus the waveform shown at FIG. 10n is produced across the capacitor.

Referring again to FIG. 5, the output of the curve pulse separator AND gate 62 is fed via line 91 through differentiating capacitor 92 to the set input of the error check flip-flop 93. Flip-flop 93 is thus turned On at the leading edge of the curve pulse and Off by the sync pulse. The output of the error check flip-flop is shown in FIG. 10j and after passing through differentiating capacitor 95 the waveform is that shown in FIG. 10k.

The function of the error check circuit is to provide timing pulses for the sampling of the intermediate storage capacitor 49 only if there has been no error in that cycle. If a scanning cycle occurs when no curve pulse is recognized, either because of a discontinuous curve or by faulty operation of the circuitry of the chart reader, the intermediate storage capacitor will be discharged until the next reference pulse, and a sampling of the intermediate storage capacitor just before the reference pulse would give an erroneous indication that the curve was on the extreme edge of the graph. Therefore, it is necessary that no sampling take place in a cycle during which no curve pulse was recognized. The error check circuit accomplishes this result, for if sync pulses but no curve pulses were fed into the flip-flop, it would always remain in the same state and there would be no differentiated output. The output of the error checking circuit is fed to the sampling and output circuits enclosed in dashed rectangle 96. The output of the error check flip-flop 93 is differentiated by differentiating capacitor 95, producing the waveform shown in FIG. 10k which is then fed to a charge control 125 and a discharge control 126 which together control the charge on output storage capacitor 97. The charge control 125 and discharge control 126 are operative at the same time in response to the differentiated pulse at the sync pulse time. The discharge control 126 drains off any excess charge placed on output storage capacitor 97 which is more than a voltage determined by the charge limit control 127 in response to the voltage across the intermediate storage capacitor 49. The output of the chart reader is then made available by the output circuit 128, responsive to the output storage capacitor 97.

Referring now to FIG. 8, there is shown the circuitry of the sampling and output circuits in detail. The differentiated output of the error check circuit (shown in FIG. 10k) appears on the input terminal 98, and is fed to inverter 99. Inverter 99 is biased so as to be normally conducting by means of bias potential 100. The positive spikes of the waveform impressed on the input do not affect the inverter, but the negative spikes cut off conduction and a positive going pulse at the time of each sync pulse appears at the output, as shown in FIG. 10m. This pulse passes via line 103 through the diode 101 and serves to charge the output storage capacitor 102. The output of the inverter 99 is also fed via line 104 to the control grid 107 of the pentode 105.

The voltage across the intermediate storage capacitor 49 is fed through a cathode follower 108, the output of which across resistor 112 is proportional to the voltage across the capacitor. This voltage is connected to the plate of a diode 109, the cathode of which is connected to the plate of pentode 105. When the grid of pentode 105 is driven positive at the sync pulse time, current from the cathode follower 108 flows through the diode 109, pentode 105 and the resistor 110 in the cathode circuit of the pentode 105. A voltage thus appears at point 111 which is the same as the voltage across resistor 112.

The current through the charge control diode 101 continues to charge output storage capacitor 102 over line 114 until it reaches the voltage level of point 111, when the discharge control diode 113 conducts through the pentode 105 to keep the voltage on the output capacitor equal to that across resistor 112. Thus the voltage across the output storage capacitor 102 is proportional to the "steady state" voltage across intermediate storage capacitor 49 which exists at the sync pulse time.

The voltage across output storage capacitor 102 is fed via line 115 into a cathode follower 116. Cathode follower 116 conducts through a voltage divider comprising resistors 117 and 118 in its cathode circuit to a bias potential 119. The output from the voltage divider is filtered by a filter condenser 120 and fed into another cathode follower 121. Cathode follower 121 conducts through its cathode resistor 122 to a bias potential 123. The output appears across terminals 124. The values of the bias potentials 119 and 123 are chosen to provide an output across terminals 124 which is zero when the curve being read crosses the time axis (shown in FIG. 2) and is either positive or negative for all finite ordinates of the plotted curve.

Referring now to FIG. 9, there is shown the circuitry of the AND gate, OR gate, and flip-flops used in connection with the invention. FIG. 9a shows the circuit which is used for both the AND and OR gates. It consists of two triodes with a common plate resistor and cathodes grounded. When both inputs A and B are positive, both triodes conduct and the output is a ground potential. When only one triode conducts, the output is still substantially at ground potential. But when both triodes are cut off due to negative inputs at A and B, the output is a high positive voltage. The circuit, therefore, may be used as an AND gate with negative inputs and a positive output. (A positive output will appear only if both inputs are negative.) It may be used as an OR gate with positive inputs and a negative output. (A negative output will be produced if either or both inputs are positive.)

FIGURE 9b shows a flip-flop well known in the art with the addition of a triode amplifier-inverter in each input. Thus the flip-flop circuit used in connection with the invention may be triggered by positive pulses, which after amplification are negative ones.

The foregoing being a full and complete specification of one form of the invention, we intend the scope of the invention to be limited only by the following claims.

We claim:

1. In a telemetering system for providing a continuous indication of the ordinates of a recorded curve, the combination comprising; a chart surface, each point on said surface having an ordinate and an abscissa associated therewith; a curve recorded on said surface, said curve having a width and each point on said curve having an ordinate and an abscissa associated therewith; first means operatively associated with said surface for providing a continuous phase modulated representation of said ordinates of said curve, said first means including scanning means having a scanning plane and a scanning path along the lines of equal abscissas of said surface, and stationary optical means for focussing an image of a portion of said curve on said scanning plane; capacitor means connected to said first means; second means connected to said capacitor means for cyclically charging said capacitor means to a predetermined reference potential; third means connected to said capacitor means for cyclically discharging said capacitor means during a time period the length of which is proportional to said representation, said time period being divided into first and second time intervals, said second time interval being proportional to said width of said curve measured along said scanning path, the rate of discharge of said capacitor means during said second time interval being half the rate of discharge of said capacitor means during said first time interval; fourth means connected to said capacitor means for cyclically sampling the charge maintained by said capacitor means after said second time interval, said fourth means maintaining a charge that is proportional to said sampled charge until said fourth means again samples said capacitor means; and fifth means connected to said capacitor means for preventing said fourth means from sampling said charge during any cycle in which no ordinate representation occurs whereby said fourth means maintains said sampled charge during any immediately consecutive subsequent cycle during which no ordinate representation occurs, thereby providing a continuous output potential proportional to the ordinates of said curve at the midpoint of the width thereof.

2. In a telemetering system for providing a continuous indication of the ordinates of a recorded curve, the combination comprising; a chart surface, each point on said surface having an ordinate and an abscissa associated therewith; a curve recorded on said surface, said curve having a width and each point on said curve having an ordinate and an abscissa associated therewith; first means operatively associated with said surface for providing a continuous phase modulated representation of said ordinates of said curve, said first means including scanning means having a scanning path along the lines of equal abscissas of said surface; capacitor means connected to said first means; second means connected to said capacitor means for cyclically charging said capacitor means to a predetermined reference potential; third means connected to said capacitor means for cyclically discharging said capacitor means during a time period the length of which is proportional to said representation, said time period being divided into first and second time intervals, said second time interval being proportional to said width of said curve measured along said scanning path, the rate of discharge of said capacitor means during said second time interval being half the rate of discharge of said capacitor means during said first time interval; fourth means connected to said capacitor means for cyclically sampling the charge maintained by said capacitor means after said second time interval, said fourth means maintaining a charge that is proportional to said sampled charge until said fourth means again samples said capacitor means; and fifth means connected to said capacitor means for preventing said fourth means from sampling said charge during any cycle in which no ordinate representation occurs whereby said fourth means maintains said sampled charge during any immediately consecutive subsequent cycle during which no ordinate representation occurs, thereby providing a continuous output potential proportional to the ordinates of said curve at the midpoint of the width thereof.

3. In a telemetering system for providing a continuous indication of the ordinates of a recorded curve, the combination comprising; a chart surface, each point on said surface having an ordinate and an abscissa associated therewith; a curve recorded on said surface, said curve having a width and each point on said curve having an ordinate and an abscissa associated therewith; first means operatively associated with said surface for providing a continuous phase modulated representation of said ordinates of said curve, said first means including scanning means having a scanning path along the lines of equal abscissas of said surface; capacitor means connected to said first means; second means connected to said capacitor means for cyclically charging said capacitor means to a predetermined reference potential; third means connected to said capacitor means for cyclically discharging said capacitor means during a time period the length of which is proportional to said representation, said time period being divided into first and second time intervals, said second time interval being proportional to said width of said curve measured along said scanning path, the rate of discharge of said capacitor means during said second time interval being half the rate of discharge of said capacitor means during said first time interval; and fourth means connected to said capacitor means for cyclically sampling the charge maintained by said capacitor means after said second time interval, said fourth means maintaining a charge that is proportional to said sampled charge until said fourth means again samples said capacitor means, thereby providing a continuous output potential proportional to the ordinates of said curve at the midpoint of the width thereof.

4. In a telemetering system for providing a continuous indication of the ordinates of a recorded curve, the combination comprising; a chart surface, each point on said surface having an ordinate and an abscissa associated therewith; a curve recorded on said surface, said curve having a width and each point on said curve having an ordinate and an abscissa associated therewith; first means operatively associated with said surface for providing a continuous phase modulated representation of said ordinates of said curve, said first means including scanning means having a scanning plane and a scanning path along the lines of equal abscissas of said surface and stationary optical means for focussing an image of a portion of said curve on said scanning plane; capacitor means connected to said first means; second means connected to said capacitor means for cyclically altering the charge on said capacitor means to provide a predetermined reference charge thereon; third means connected to said capacitor means for cyclically altering said reference charge during a time period the length of which is proportional to said representation, said time period being divided into two time intervals, one of said two time intervals being proportional to said width of said curve measured along said scanning path, the rate of alteration of said charge on said capacitor means during said one time interval being half the rate of alteration of said charge on said capacitor means during the other of said two time intervals; fourth means connected to said capacitor means for cyclically sampling the charge maintained by said capacitor means after said time period, said fourth means maintaining a charge that is proportional to said sampled charge until said fourth means again samples said capacitor means; and fifth means connected to said capacitor means for preventing said fourth means from sampling said charge during any cycle in which no ordinate representation occurs whereby said fourth means maintains said sampled charge during any immediately consecutive subsequent cycle during which no ordinate representation occurs, thereby providing a continuous output potential proportional to the ordinates of said curve at the midpoint of the width thereof.

5. In a telemetering system for providing a continuous indication of the ordinates of a recorded curve, the combination comprising; a chart surface, each point on said surface having an ordinate and an abscissa associated therewith; a curve recorded on said surface, said curve having a width and each point on said curve having an ordinate and an abscissa associated therewith; first means operatively associated with said surface for providing a continuous phase modulated representation of said ordinates of said curve, said first means including scanning means having a scanning path along the lines of equal abscissas of said surface; capacitor means connected to said first means; second means connected to said capacitor means for cyclically altering the charge on said capacitor means to provide a predetermined reference charge thereon; third means connected to said capacitor means for cyclically altering said reference charge during a time period the length of which is proportional to said representation, said time period being divided into two time intervals, one of said two time intervals being proportional to said width of said curve measured along said scanning path, the rate of alteration of said charge on said capacitor means during said one time interval being half the rate of alteration of said charge on said capacitor means during the other of said two time intervals; fourth means connected to said capacitor means for cyclically sampling the charge maintained by said capacitor means after said time period, said fourth means maintaining a charge that is proportional to said sampled charge until said fourth means again samples said capacitor means; and fifth means connected to said capacitor means for preventing said fourth means from sampling said charge during any cycle in which no ordinate representation occurs whereby said fourth means maintains said sampled charge during any immediately consecutive subsequent cycle during which no ordinate representation occurs, thereby providing a continuous output potential proportional to the ordinates of said curve at the midpoint of the width thereof.

6. In a telemetering system for providing a continuous indication of the ordinates of a recorded curve, the combination comprising; a chart surface, each point on said surface having an ordinate and an abscissa associated therewith; a curve recorded on said surface, said curve having a width and each point on said curve having an ordinate and an abscissa associated therewith; first means operatively associated with said surface for providing a continuous phase modulated representation of said ordinates of said curve, said first means including scanning means having a scanning path along the lines of equal abscissas of said surface; capacitor means connected to said first means; second means connected to said capacitor means for cyclically altering the charge on said capacitor means to provide a predetermined reference charge thereon; third means connected to said capacitor means for cyclically altering said reference charge during a time period the length of which is proportional to said representation, said time period being divided into two time intervals, one of said two time intervals being proportional to said width of said curve measured along said scanning path, the rate of alteration of said charge on said capacitor means during said one time interval being half the rate of alteration of said charge on said capacitor means during the other of said two time intervals; and fourth means connected to said capacitor means for cyclically sampling the charge maintained by said capacitor means after said time period, said fourth means maintaining a charge that is proportional to said sampled charge until said fourth means again samples said capacitor means, thereby providing a continuous output potential proportional to the ordinates of said curve at the midpoint of the width thereof.

7. In a telemetering system for providing a continuous indication of the ordinates of a recorded curve, the combination comprising; a chart surface, each point on said surface having an ordinate and an abscissa associated therewith; a curve recorded on said surface, each point on said curve having an ordinate and an abscissa associated therewith; first means operatively associated with said surface for providing a continuous phase modulated representation of said ordinates of said curve, said first means including scanning means having a scanning path along the lines of equal abscissas of said surface; capacitor means connected to said first means; second means connected to said capacitor means for cyclically charging said capacitor means to a predetermined reference potential; third means connected to said capacitor means for cyclically discharging said capacitor means during a time period the length of which is proportional to said representation; fourth means connected to said capacitor means for cyclically sampling the charge maintained by said capacitor means after said time period, said fourth means maintaining a charge that is proportional to said sampled charge until said fourth means again samples said capacitor means; and fifth means connected to said capacitor means for preventing said fourth means from sampling said charge during any cycle in which no ordinate representation occurs whereby said fourth means maintains said sampled charge during any immediately consecutive subsequent cycle during which no ordinate representation occurs, thereby providing a continuous output potential proportional to the ordinates of said curve.

8. In a telemetering system for providing a continuous indication of the ordinates of a recorded curve, the combination comprising; a chart surface, each point on said surface having an ordinate and an abscissa associated therewith; a curve recorded on said surface, each point on said curve having an ordinate and an abscissa associated therewith; first means operatively associated with said surface for providing a continuous phase modulated representation of said ordinates of said curve, said first means including scanning means having a scanning path along the lines of equal abscissas of said surface; capacitor means connected to said first means; second means connected to said capacitor means for cyclically altering the charge on said capacitor means to provide a charge on said capacitor means proportional to said ordinate of said curve during a predetermined portion of each cycle; third means connected to said capacitor means for cyclically sampling the charge maintained by said capacitor means at a time when said charge is proportional to said ordinate of said curve, said third means maintaining a charge corresponding to said sampled charge until said third means again samples said capacitor means; and fourth means connected to said capacitor means for preventing said third means from sampling said charge during any cycle in which no ordinate representation occurs whereby said third means maintains said sampled charge during any immediately consecutive subsequent cycle during which no ordinate representation occurs, thereby providing a continuous output potential proportional to the ordinates of said curve.

9. In a telemetering system for providing a continuous indication of the ordinates of a recorded curve, the combination comprising; a chart surface, each point on said surface having an ordinate and an abscissa associated therewith; a curve recorded on said surface, each point on said curve having an ordinate and an abscissa associated therewith; first means operatively associated with said surface for providing a continuous phase modulated representation of said ordinates of said curve, said first means including scanning means having a scanning plane and a scanning path along the lines of equal abscissas of said surface and stationary optical means for focussing an image of a portion of said curve on said scanning plane; capacitor means connected to said first means; second means connected to said capacitor means for cyclically charging said capacitor means to a predetermined reference potential; third means connected to said capacitor means for cyclically discharging said capacitor means during a time period the length of which is proportional to said representation; and fourth means connected to said capacitor means for cyclically sampling the charge maintained by said capacitor means after said time period, said fourth means maintaining a charge that is proportional to said sampled charge until said fourth means again samples said capacitor means, thereby providing a continuous output potential proportional to the ordinates of said curve.

10. In a telemetering system for providing a continuous indication of the ordinates of a recorded curve, the combination comprising; a chart surface, each point on said surface having an ordinate and an abscissa associated therewith; a curve recorded on said surface, each point on said curve having an ordinate and an abscissa associated therewith; first means operatively associated with said surface for providing a continuous phase modulated representation of said ordinates of said curve, said first means including scanning means having a scanning plane and a scanning path along the lines of equal abscissas of said surface and stationary optical means for focussing an image of a portion of said curve on said scanning plane; capacitor means connected to said first means; second means connected to said capacitor means for cyclically altering the charge on said capacitor means to provide a charge on said capacitor means proportional to said ordinate of said curve during a predetermined portion of each cycle; and third means connected to said capacitor means for cyclically sampling the charge maintained by said capacitor means at a time when said charge is proportional to said ordinate of said curve, said third means maintaining a charge corresponding to said sampled charge until said third means again samples said capacitor means, thereby providing a continuous output potential proportional to the ordinates of said curve.

11. In a telemetering system for providing a continuous indication of the ordinates of a recorded curve, the combination comprising; a chart surface, each point on said surface having an ordinate and an abscissa associated therewith; a curve recorded on said surface, each point on said curve having an ordinate and an abscissa associated therewith; first means operatively associated with said surface for providing a continuous phase modulated representation of said ordinates of said curve, said first means including scanning means having a scanning path along the lines of equal abscissas of said surface; capacitor means connected to said first means; second means connected to said capacitor means for cyclically altering the charge on said capacitor means to provide a charge on said capacitor means proportional to said ordinate of said curve during a predetermined portion of each cycle; and third means connected to said capacitor means for cyclically sampling the charge maintained by said capacitor means at a time when said charge is proportional to said ordinate of said curve, said third means maintaining a charge corresponding to said sampled charge until said third means again samples said capacitor means, thereby providing a continuous output potential proportional to the ordinates of said curve.

References Cited in the file of this patent

UNITED STATES PATENTS

| | | |
|---|---|---|
| 2,399,668 | Francis | May 7, 1946 |
| 2,421,022 | Francis | May 27, 1947 |
| 2,532,098 | Holcomb | Nov. 28, 1950 |
| 2,663,857 | Holcomb | Dec. 22, 1953 |
| 2,674,916 | Smith | Apr. 13, 1954 |
| 2,731,626 | Carolus | Jan. 17, 1956 |
| 2,763,852 | Henrich | Sept. 18, 1956 |